(No Model.) 2 Sheets—Sheet 1.

N. NILSON.
TRAP.

No. 544,743. Patented Aug. 20, 1895.

Witnesses:
C. E. Van Doren.
M. E. Gooley

Inventor:
Nils Nilson.
By Paul Hawley
his Attorneys.

(No Model.) 2 Sheets—Sheet 2.

N. NILSON.
TRAP.

No. 544,743. Patented Aug. 20, 1895.

Witnesses:
C. E. Van Doren.
M. C. Gooley

Inventor;
Nils Nilson.
By Paul Hawley
his Attorneys.

UNITED STATES PATENT OFFICE.

NILS NILSON, OF MINNEAPOLIS, MINNESOTA.

TRAP.

SPECIFICATION forming part of Letters Patent No. 544,743, dated August 20, 1895.

Application filed February 6, 1895. Serial No. 537,454. (No model.)

*To all whom it may concern:*

Be it known that I, NILS NILSON, of Minneapolis, in the county of Hennepin and State of Minnesota, have invented certain new and useful Improvements in Traps, of which the following is a specification.

My invention relates to a steam-trap wherein the water of condensation from steam-heating or other systems is collected and disposed of without the waste of steam.

The object of my invention is to provide a steam-trap the valve of which will close with pressure; further, the valve of which will open with pressure in case the pressure exceeds a safe limit, and, further, a steam-trap wherein the valve will be opened when the water in the trap rises above a certain stage or level; and a further object of my invention is to provide a steam-trap of an extremely simple and cheap construction and yet, as above outlined, one which will fulfill more than the usual offices of such a device.

To these ends my invention consists in the combination, with a suitable casing or trap proper, of a valve-seat-carrying diaphragm and a valve normally stationary with respect to said casing, and whereupon said seat is adapted to be closed by the action of pressure upon said diaphragm.

Further, my invention consists in means for limiting the movement of said diaphragm, means for returning the same when relieved from pressure, and, further, in means within the trap for moving said valve away from the distended diaphragm when the water in the trap rises above a certain level; and, further, my invention consists in various details of construction and in combinations, all as hereinafter described, and particularly pointed out in the claims.

The invention will be more readily understood by reference to the accompanying drawings, forming part of this specification, and in which—

Figure 1:
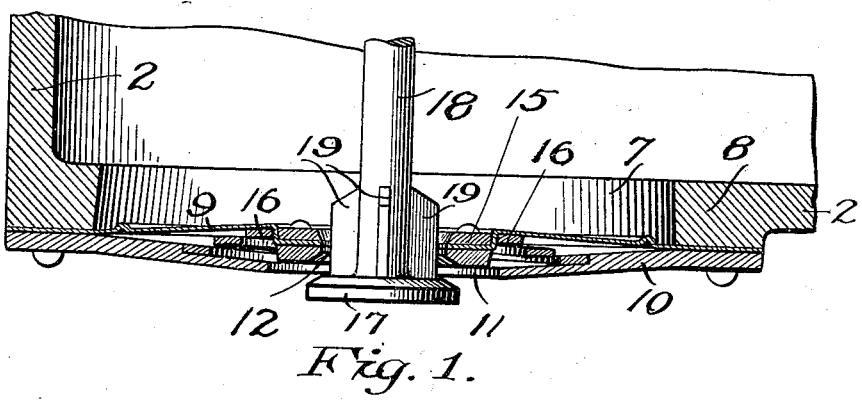
Figure 2:
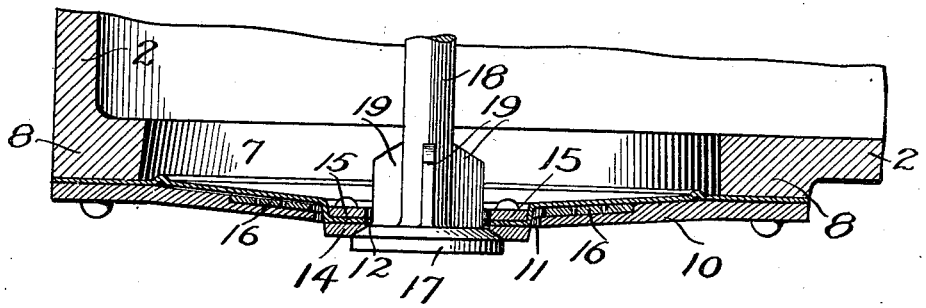
Figure 3:
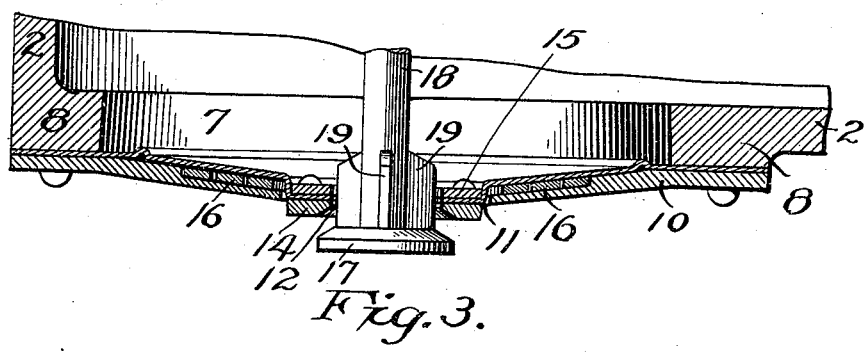
Figure 4:
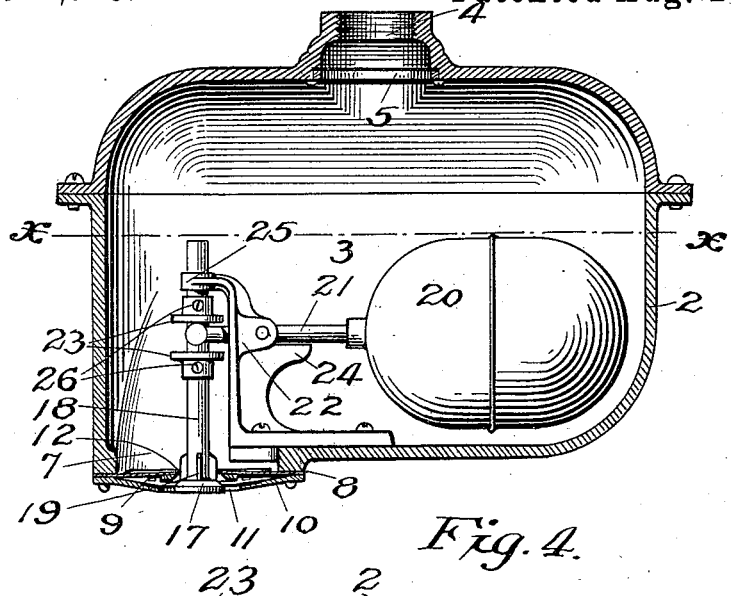
Figure 5:
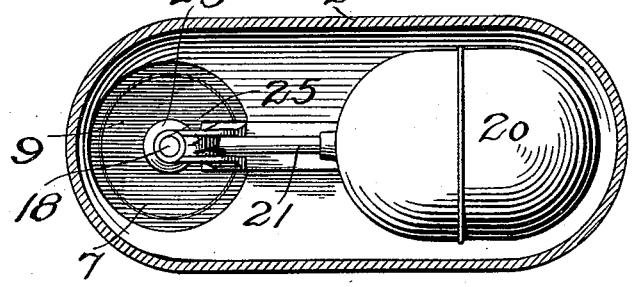
Figure 6:
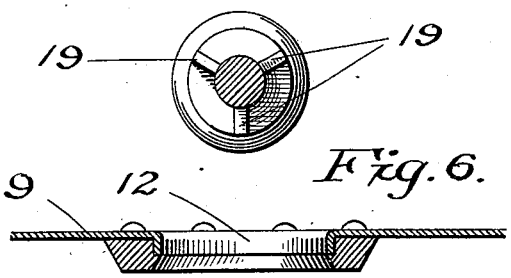
Figure 7:

Figures 1, 2, and 3 are detail sectional views, each showing my diaphragm-valve in a different position. Fig. 4 is a vertical section showing a steam-trap provided with such a diaphragm-valve. Fig. 5 is a horizontal section of the steam-trap on the line $x\,x$ of Fig. 1. Fig. 6 is a detail plan view of the valve, the stem being shown in section. Fig. 7 is a sectional detail illustrating a somewhat different construction of the valve-seat portion of the diaphragm.

As shown in the drawings, the steam-trap of which the diaphragm-valve forms the principal and essential feature comprises a casing or trap proper 2, preferably in two parts, within which is a large chamber 3, into which the steam and water are admitted through the opening 4 in the top. A strainer 5 is preferably provided to prevent the passage of any material which would be liable to clog the valve. In the bottom of the casing is a large circular opening 7, around which is a smooth base or shoulder 8, whereon the edges of the circular diaphragm 9 are secured.

10 represents a limiting-disk, preferably dished in form and having a large central opening 11. This disk is secured over the edges of the diaphragm, as plainly shown. The diaphragm itself is provided with a central opening 12 about which a separate seat-ring 14 is provided, the under surface thereof being beveled to form the valve-seat. Several constructions may be adopted for the valve-seat upon the diaphragm, the one preferred being shown in Figs. 1 to 3, wherein the center of the diaphragm is depressed to admit the strengthening and binding ring 15 upon the upper side thereof without its projecting above the upper surface of the diaphragm itself. Hence the ring, which adds materially to the fastening of the seat-ring, in no wise interferes with the perfect drainage of the trap.

Between the diaphragm and the limiting-disk I provide a strong spring 16, preferably of the pyramid form, the coils of which are adapted to fold within one another, and said spring adapted to raise the diaphragm when it is relieved from pressure. The valve 17 is arranged outside of the diaphragm or beneath it, and its stem 18 projects up through the opening in the diaphragm, being held centrally therein by the wings 19 on the stem. For many uses this part of the valve may be permanently stationary, the diaphragm closing down on the same when pressure is exerted thereon and being raised out of contact with the valve by its spring when pressure is relieved. In order, however, to dispose of a large amount of water which may collect in the trap, I provide means for depressing or moving outwardly the valve part 17 when the pressure within the trap exceeds a safe limit, or when, as often occurs, the water in the trap rises to a given height. For the former purpose it is only necessary to provide means which will hold the valve 17 in position against ordinary pressures, but which will yield under excessive pressure and permit the valve to move away from the distended diaphragm valve-seat.

The valve is fitted to operate under both conditions by the use of a float 20 within the trap, the float being secured upon a short lever 21, pivoted upon a suitable interior frame 22, and having its outer end arranged between suitable shoulders 23, provided on the valve-stem 18. This float will rise to the level of the water collecting in the trap and will thus open the valve, while when but little water is in the trap the weight of the float will act as a counterbalance upon the pressure of the steam on the valve itself.

The frame 22 is preferably provided with a stop 24 for the float-lever, and also has a guide-sleeve 25 at its upper end for the upper end of the valve-stem. Further, in order that the valve may not be operated by the first upward movement of the float some play is allowed the lever between the two collars on the stem, these two collars, by means of set-screws 26, being made adjustable thereon. In place of the shoulder 24 the sleeve 25 and the upper collar may form a suitable stop. Were it not for the limiting-disk 10 a high steam-pressure within the trap would force the diaphragm beyond its strength of return.

Having thus described my invention, I claim as new and desire to secure by Letters Patent—

1. The combination, of the valve disk, a seat carrying diaphragm adapted to be closed upon said valve disk by pressure, means for limiting the outward or closing movement of said diaphragm, and a spring interposed between the limiting device and the diaphragm, whereby the diaphragm and valve seat are returned when pressure is relieved, thereby opening the valve, substantially as described.

2. The combination, with a suitable trap or chamber, of an opening in the wall thereof, a diaphragm provided in said opening, said diaphragm itself having a central opening and carrying a valve seat, a valve stem, a valve disk thereon upon which said diaphragm valve seat is adapted to be closed by pressure, and a counterweight or balance connected with said stem, whereby said valve disk is held stationary under all ordinary pressures, but is adapted to move outwardly upon the accumulation of excessive pressure in said chamber or trap, substantially as described.

3. The combination, with a suitable chamber or trap, of a valve seat carrying diaphragm arranged in connection therewith to be operated by pressure within said trap, a valve disk whereon said diaphragm valve seat is adapted to close, and a float provided in said trap and connected with said valve disk, whereby upon the accumulation of either excessive pressure in said trap or the accumulation of water therein said valve disk will be moved outwardly, substantially as described.

4. The combination, with a suitable trap or chamber, of a valve seat carrying diaphragm adapted to be influenced by pressure within said trap, means for limiting the outward movement of said diaphragm, a return spring provided in connection with said diaphragm, a valve disk having a stem extending through the opening in the diaphragm, the float and float lever provided within the trap, said lever engaging said valve stem, and means for limiting the movement in one direction of said lever and stem, substantially as described.

5. In a steam trap, the combination, with the trap proper, the valve, a diaphragm adapted to be distended by pressure of steam within the trap and whereby said valve is opened and closed, and a float provided within the trap and connected with the stem of said valve and adapted to actuate said valve upon the accumulation of water in the trap, substantially as described.

6. The combination, in a steam trap, of the trap or chamber proper provided with an opening in its bottom, a diaphragm provided in said opening and having a central opening about which a valve seat is provided, a valve disk to be engaged by said valve seat when the diaphragm is distended by pressure, the stem of said disk, guides therefor within the trap, limiting stops in connection therewith, a float provided within the trap proper and adapted to engage the said valve stem to normally hold the same in its raised position, but to depress or lower the same when the float is raised by water in the trap, substantially as described.

In testimony whereof I have hereunto set my hand this 23d day of January, A. D. 1895.

NILS NILSON.

In presence of—
FREDERICK S. LYON,
RICHARD PAUL.